Feb. 19, 1952
T. R. LAING
2,585,945
MANUALLY CONTROLLED PHOTOGRAPHIC
EXPOSING, DEVELOPING, AND
FIXING DEVICE
Filed Nov. 7, 1947
5 Sheets-Sheet 1
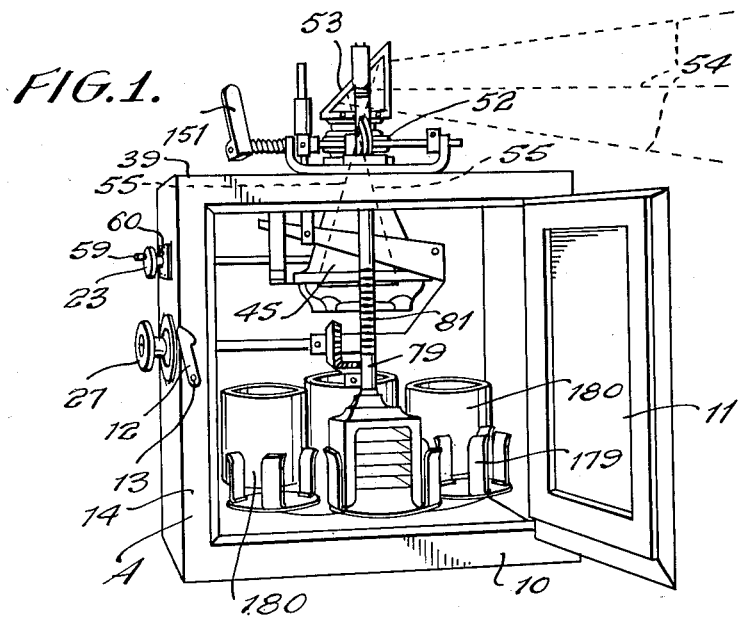
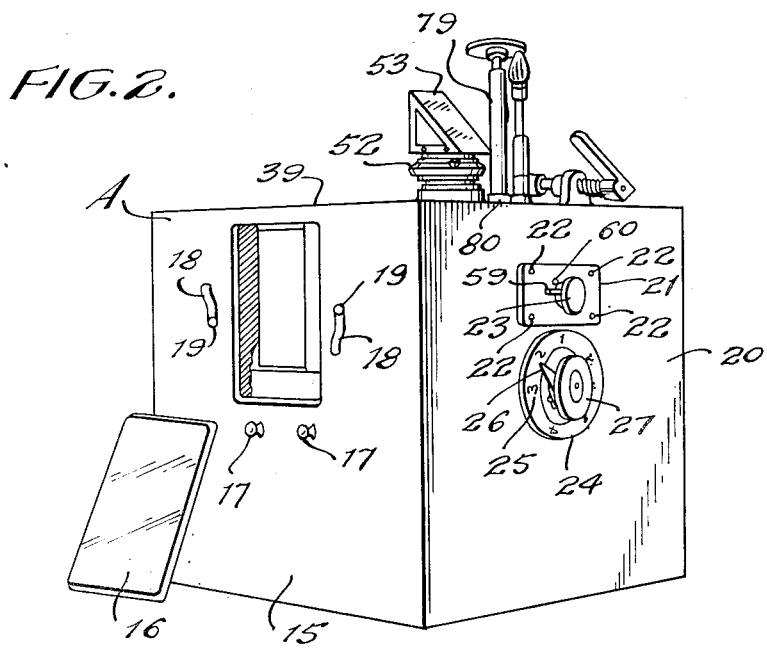
INVENTOR.
TORRANCE R. LAING
BY
ATTORNEY

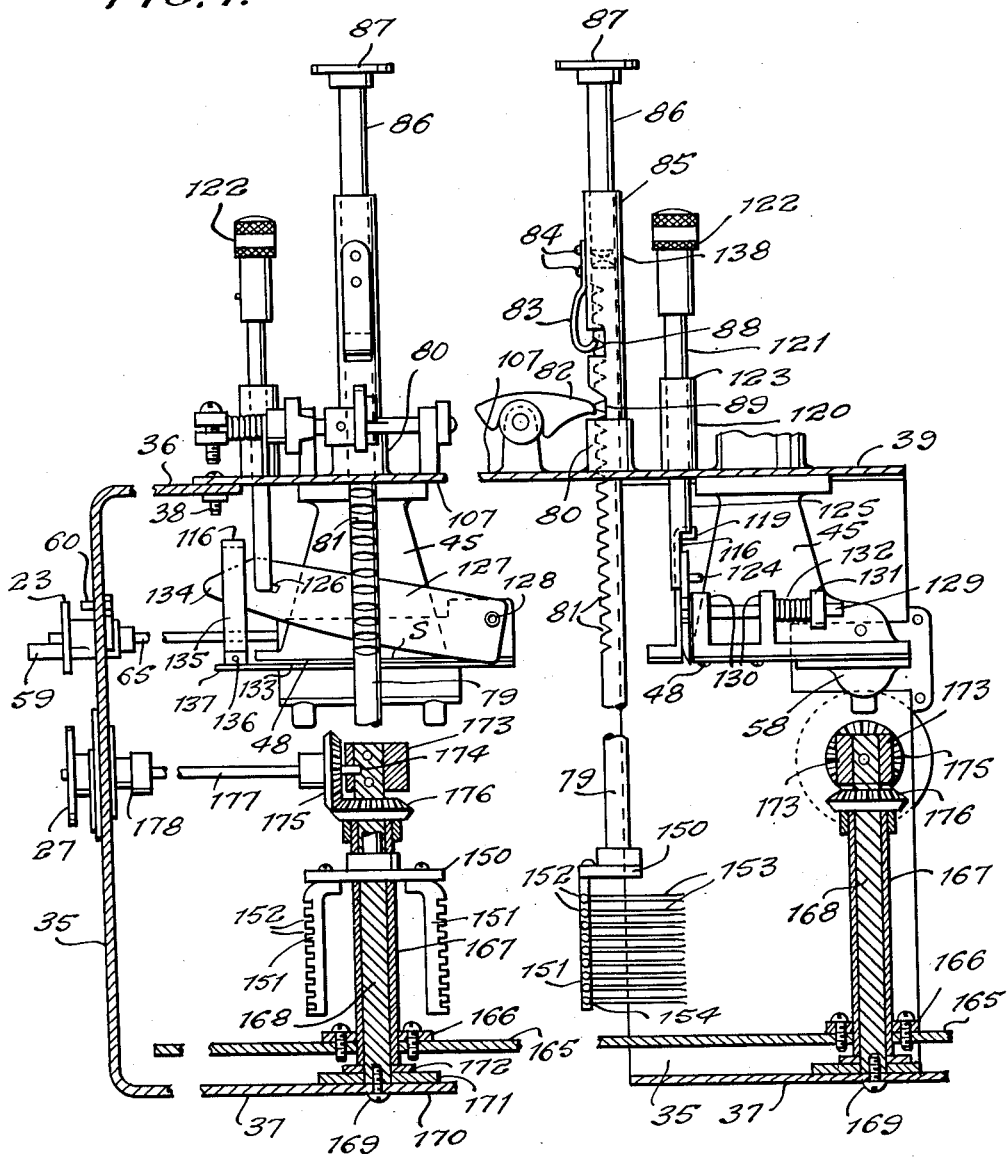

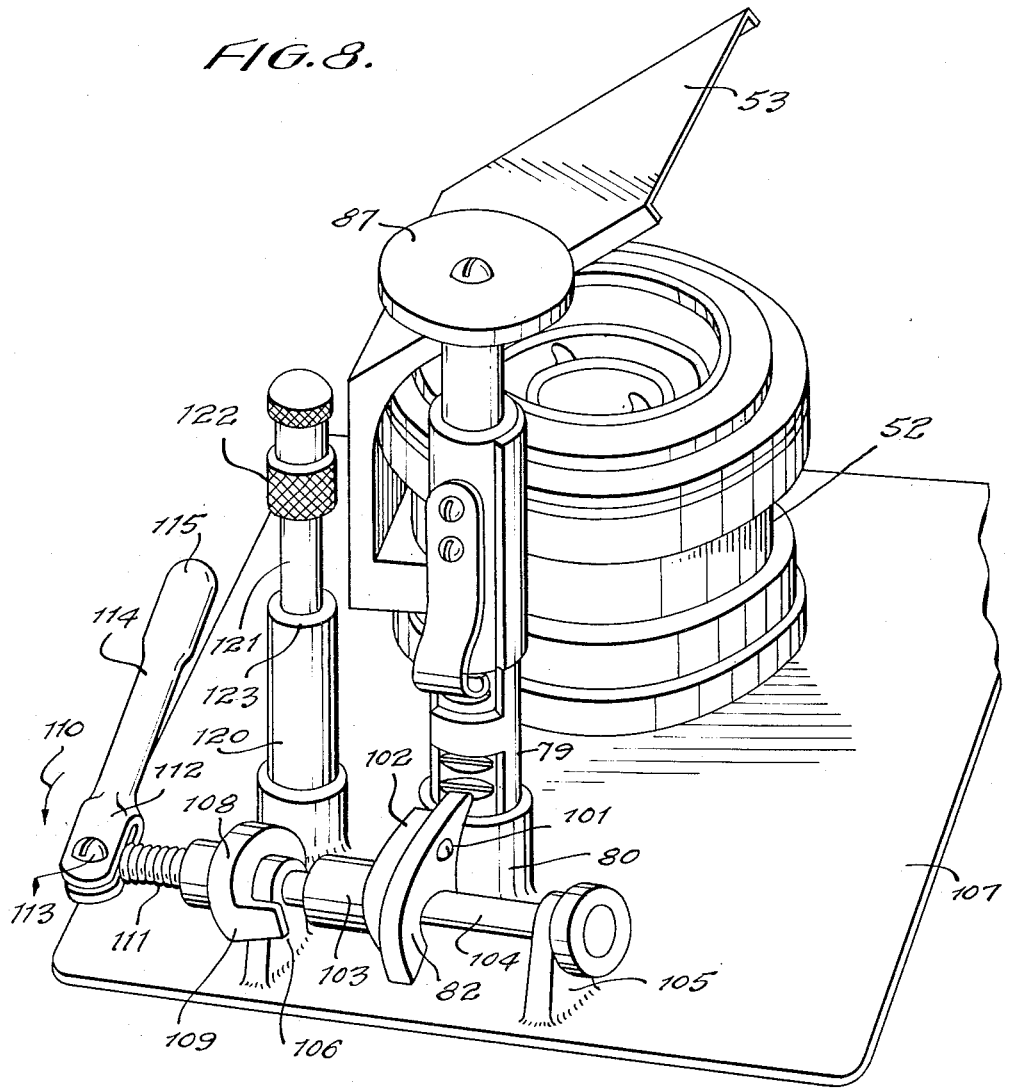

Patented Feb. 19, 1952

2,585,945

UNITED STATES PATENT OFFICE 2,585,945

MANUALLY CONTROLLED PHOTOGRAPHIC EXPOSING, DEVELOPING, AND FIXING DEVICE

Torrance R. Laing, New York, N. Y.; Matilde E. Krause executrix of said Torrance R. Laing, deceased Application November 7, 1947, Serial No. 784,657

7 Claims. (Cl. 95—13)

The present invention relates to a photographic device and it particularly relates to a photograph taking and dispensing device.

It is among the objects of the present invention to provide a compact simplified durable readily operated photographic device which by simple manipulations of levers and knobs will successively feed a continuous strip of photographic paper from a supply reel, expose the same in frames to take a picture, cut off the frames, carry the frames into a developing and fixing solution and then permit removal of the developed and fixed pictures, all without opening of the camera box and while maintaining the light tightness of the camera box.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to provide a light-tight camera box or enclosure with a readily removable and refillable container carrying a supply of or continuous roll of positive photographic paper. By operating rollers from the exterior of the box or enclosure the positive paper may be fed through the focal plane of a camera device to which it may be exposed and pictures taken through a lens, shutter and iris combination and a picture taken.

The paper is stopped by being moved up against and into a holder with spring fingers designed to grasp and retain the end of the continuous strip. Between the holders and the camera is a cutter or swinging knife for cutting the photographic paper after exposure into frames.

A series of these holders are provided one above the other and the rod carrying the holders may be moved in steps from the outside of the enclosure to receive successive frames.

At the base of the enclosure is positioned a gear driven revolving turntable carrying containers for developing, washing and fixing solutions, into which the holder may be inserted after the spring fingers have all received the exposed frames. The exposed frames in a group on the holder are all successively lowered into the containers of developing, washing, fixing and washing liquids and then the box or enclosure may be opened. This may be accomplished by turning the table step by step through the gearing arrangement to bring one container after another under the holder. Then the holder will be lowered and rotated in the container.

When the box is opened the sensative paper in the camera focal plane and in the supply container will still be protected against the light. After the exposed frames are removed, the box or enclosure may be closed and the process repeated.

Any number of frames may be exposed at one time, for example from one to ten.

In the preferred embodiment, the lens may be positioned on the top of the box with the reciprocable and rotatable handle for operating the spring finger carriers which carry the exposed and cut frames. The cutter operator handle may also be positioned on the top of the casing.

The handles for advancing the photographic paper frame by frame and for rotating the turntable may be positioned at the side of the light-tight container or enclosure, which may be mounted on a tripod or table.

The supply box for photographic paper may be positioned at and removably clipped or locked into the side of the container so that it may readily be removed for replenishment of the sensitive paper and thereafter replaced.

The invention also consists in certain new and original features of construction and combination of parts hereinafter set forth and claimed and as to its other objects, features and advantages, the mode of operation and manner of its organization, these, inter alia, may be better understood by referring to the following description considered in connection with the accompanying drawings forming a part thereof in which:

Fig. 1 is a front perspective view of the cabinet of the photographic apparatus according to the present invention;

Fig. 2 is a side perspective view of another part of the cabinet;

Figs. 4 and 5 are vertical sectional views of the arrangement of Fig. 3 at right angles to each other;

Fig. 8 is a top perspective view of the upper portion of the device upon an enlarged scale more clearly to show the construction thereof.

Figure 3:
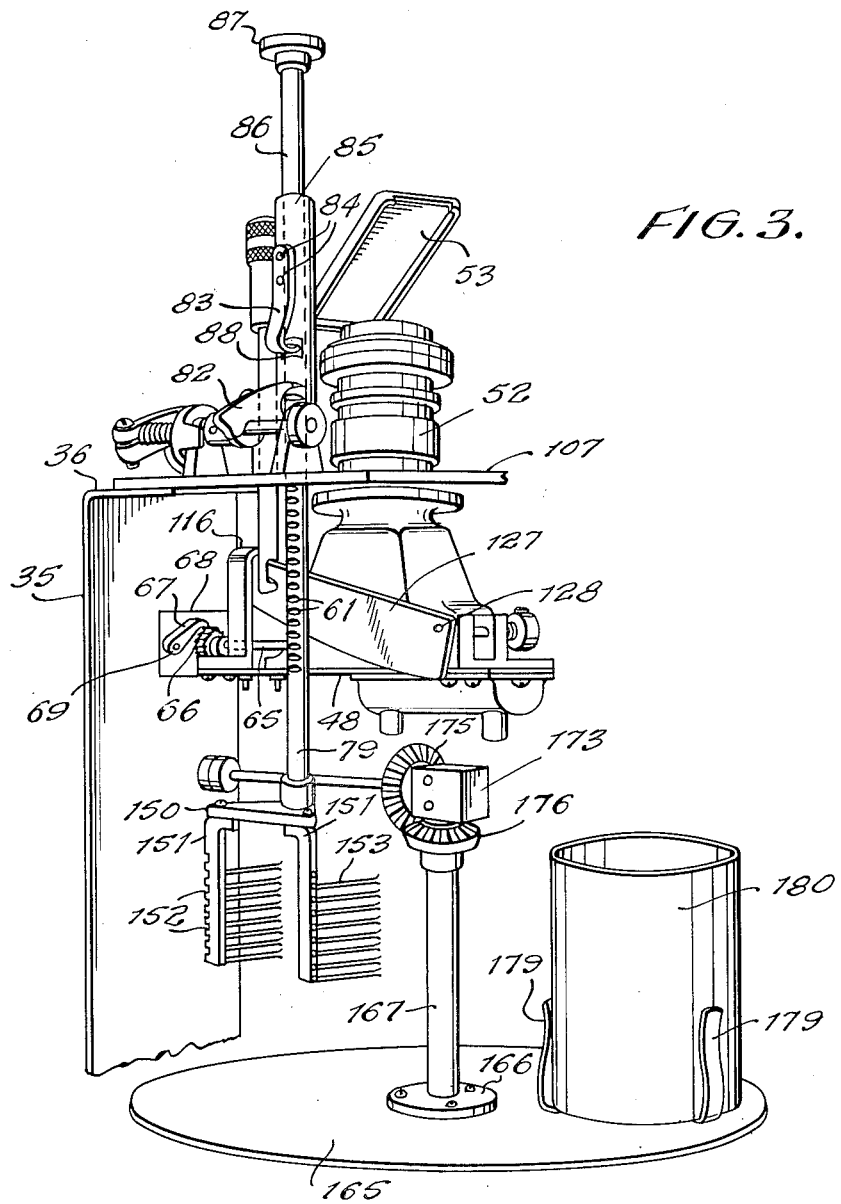
Fig. 3 is a perspective view upon a somewhat enlarged scale as compared to Figs. 1 and 2 of the interior construction with the cabinet removed.

Referring to Figs. 1 and 2, the light-tight cabinet A is provided with a front wall 10 having the door 11 with a latch 12 mounted at 13 on the side 14. The wall 15 is provided with a removable panel 16 held in position by the rests 17 and the latches 18 pivotally mounted at 19. The panel 16 enables access to removal, loading and reinsertion of the roll receiving magazine or box 40. The side wall 20 is provided with a plate 21 held in position by the screws or rivets 22 having the control knob 23 for advancing the film or sensitive paper strip. Below the plate 21 is the dial 24 on the wall 20 having the position numbers 25 which correspond with a pointer 26 rotatable by the knob 27. The position numbers 25 indicate the photograph developing and fixing.

The operating mechanism is best shown in Figs. 3, 4 and 5. As shown there is an internal U-bracket 35 having an upper leg 36 and a lower leg 37. The upper leg 36 carries the plate 107 by the screw 38. Mounted on the plate 107 below the top wall 39 of the casing A is a removable box 40 (see Fig. 6) having a shaft 41 carrying the roll of photographic paper or film 42 indicated broadly by the letters S.

The roll of film 42 passes out of the removable box 40 through the slot 43 and into the opening 44 of the exposure chamber 45. The exposure chamber 45 is provided with the downwardly diverging side walls 47 (see Fig. 6) and the base 48 over which the strip of film 49 passes. The base 48 will position the photographic paper 49 in the focal plane of the camera lens 52 of Fig. 3.

The strip of film 49 is fed by the guide rollers 50 which are mounted on the shafts 51. The rollers 50 are pressed together by the springs 56 under each end of the shaft 51 of the lower roller 50. The springs 56 are held in the box 58. The upper roller 59 is driven by the rod 65 from the knob 23 to advance the sensitive strip S.

The knob 23 may be provided with a control pin 59 which may be screwed into the knob 23 or be spring pressed. The pin 59 will hit a stop 60 after turning the knob 23 through 360° which will advance the film one frame. After each stop the pin 59 may be withdrawn to permit the knob 23 to be turned beyond the stop 60, another 360° and advance the paper S one more frame.

Figure 6:
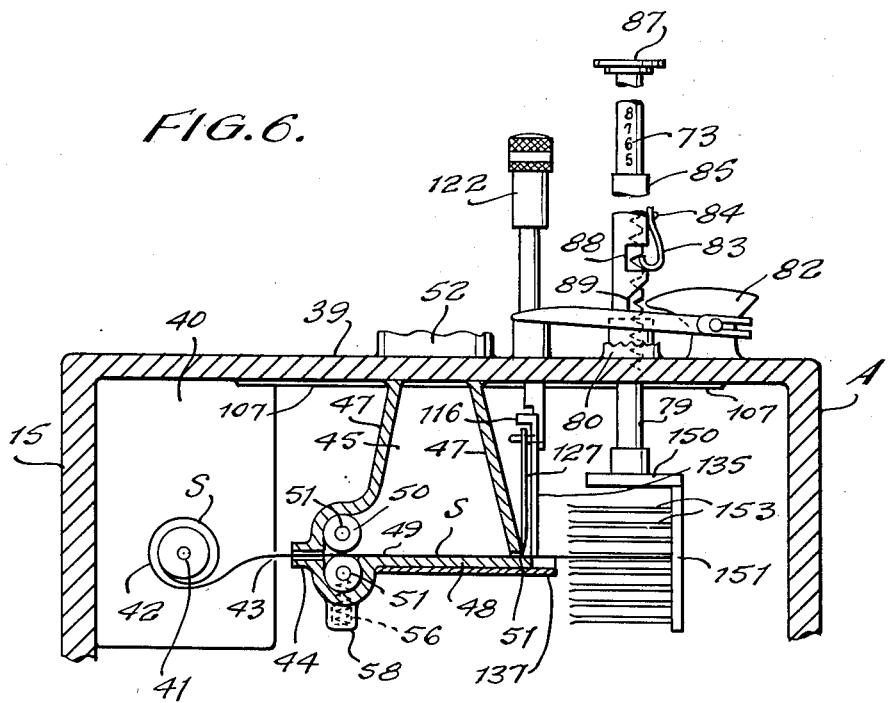
Fig. 6 is a schematic transverse sectional view of the upper part of the apparatus showing the film supply.

The film passes out of the exposure chamber 45 at 51 (see Fig. 6). The exposure chamber is provided with a lens device upon which is mounted a 45° reflector or prism 53. This reflector or prism 53 as indicated by the dotted lines 54 receives light from the object to be photographed and transmits it to the frame 49 as indicated by the lines 55.

To advance the film the upper feed wheel 50 is rotated by the shaft 65 having the ratchet 66 and the pawl 67 is mounted upon the plate 68 by the pivot pin 69.

The lens 52 is provided with suitable iris and shutter means and adjustments therefor to regulate the amount of light admitted and the length of the exposure.

After the film has been exposed and passes out of the exposure chamber 45 it will pass under the swinging cutter blade 127 and into the spring clip retainer jaws 153 (see Figs. 3 and 6). The spring clip jaws 153 are carried by an upright toothed rod 79. The rod 79 passes through the bearing sleeve 80 in the top plate 107 of the enclosure or casing (see Figs. 4, 5, 6 and 8).

The shaft 79 is provided with a plurality of teeth 81 which engage the pawl 82 and the spring 83. The rod 79 is also provided with a groove 138 above said teeth 81. The spring 81 is mounted by the rivets 84 on the sleeve 85 which forms a bearing for the upper part 86 of the rod 79. The rod 86 at its top has the hand actuating member 87. The spring 83 contacts the teeth through the cutout 88 in the sleeve 85, while the pawl 82 contacts the teeth through the cutout 89.

The operation of the pawl 82 is best shown in Fig. 8. The pawl 82 is pivotally mounted by the screw 101 on the extension 102 of the sleeve 103. The sleeve 103 is mounted on the shaft 104 which has bearings 105 and 106 mounted on the plate 107. The shaft 104 also carries the stop collar 108 having the stop leg 109 abutting the bearing member 106. The stop leg 109 is normally biased in direction 110 by the coil spring 111, one end of which is fixed to the split collar 112 clamped by the screw 113 on the end of the shaft 104. The other end of the spring 111 is mounted on the plate 107. The handle 114 has a finger press portion 115.

The bearing sleeve 120 (see Figs. 5 and 8) mounted on the plate 107 carries the rod 121 with the handle sleeve 122 acting as a stop against the top 123 of the bearing sleeve 120. The rod 120 has a cutout portion 119 and a transverse pin 124 at its lower end 125. The pin 124 fits into the slot 126 in the swinging knife 127. The knife 127 is pivotally mounted at 128 on the shaft 129 having bearings in the U-bracket 130. The end of the shaft 129 carries the collar 131 holding the coil spring 132 in position.

The knife 127 acts against the inside edge 133 of the plate 48 (see Fig. 6) to cut the photographic paper 49 into exposures or frames. The end 134 of the knife 127 is guided by the bracket 132 which is screwed by the leg 136 on to the extension plate 136. The upper end of the bracket 135 has a stop 116.

The rod 79 at its lower end carries the plate 150 (see Figs. 3 to 6) which carries the depending arms 151. The arms 151 are slotted at 152 and carry the spring clip fingers 153 which receive the cut off frames or photographic sheets after exposure. The spring clip fingers 153 are held in position by clamp studs 154 (see Fig. 5).

The turntable 165 has a center annulus 166 mounted on the rotary sleeve 167 which turns on the bearing rod 168. The rod 168 is mounted by the screw 169 on the arm 37 of the bracket 35. The rod 168 carries the thrust bearing washers 171 and 172. The bearing post 168 carries the block 173 which has the bearing 174 for the vertical bevel gear 175. The vertical bevel gear 175 meshes with and drives the horizontal bevel gear 176 which is fixed on the sleeve 167. The bevel gear 175 is turned by the shaft 177 having the bearing 178 in the bracket 35. The shaft 177 is operated by the handle or knob 27.

The turntable 165 has the clips 179 each of which receives a cup or glass 180 for the developing and fixing solutions and washing water.

Figure 7:
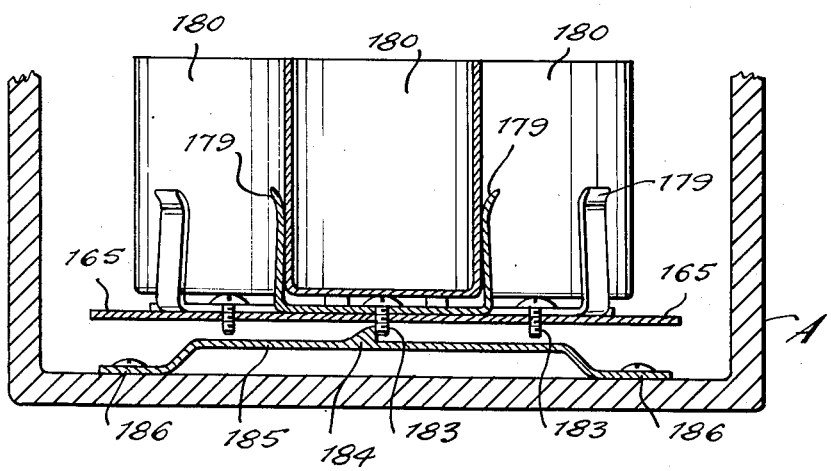
Fig. 7 is a schematic transverse sectional view of the bottom part of the apparatus.

Below each cup 180 (see Fig. 7) screw shanks 183 which ride over the one direction stops 184 on the springs 185 held down by the screws 186. This will prevent return movement of the turntable 165.

The figures 73 on rod 79 will indicate which spring fingers 153 are in position opposite slot 51 to receive the next film frame after exposure in chamber 45 and after feeding by rollers 50 and cut off by knife 127.

The groove 139 engaging the spring 83 will indicate when the films held in the spring clamps 153 are above the development cups 180 (see Fig. 3).

When the rod 79 is stopped in lowermost position, the batch of 8 frames in spring fingers 153 will be lowered into development cup 180. A greater or lesser number of clips 153 may be utilized with a greater or lesser number of teeth 81.

In operation, the film roll 42 is placed on the shaft 41, threaded between the rollers 50, passed through the exposure chamber 47, past the cutter 127 and into the spring finger clips 153. Then a frame is cut off by the cutter 127 by pressing down on the handle 122 and then lifting upwardly until the blade 127 strikes the stop 116. If the apparatus is working properly, the exposed film may be run through in a dark room.

Then the doors 11 and 16 are closed, the rod 79 lifted to its uppermost position with the lowermost tooth 81 opposite the pawl 82. The pointer 26 should be opposite point 1 on the disk 24 of Fig. 2.

Then the camera 53 is operated to make an exposure on the frame 49 in the exposure box or chamber 47.

The preceding exposed frame 49 now on the fingers 153 may be cut off by operating the cutter blade 127 from handle 122. The handle 122 is first pressed down then lifted.

Then the handle 115 is operated to actuate pawl 82 to move rod 79 down one tooth 81 bringing empty spring clip fingers 153 down to receive next exposed frame 49. The exposed frame 49 will be advanced into the fingers 153 and stopped against U-bracket 151 by turning the handle 23 by 360° until the spring pressed pulled pin 59 is stopped against fixed stop pin 60.

Another exposure is made by camera 53, the cutter 127 is operated, the rod 79 advanced another notch or tooth 81 and the handle or knob 23 again rotated 360°.

When the spring fingers 153 have received the desired number of frames 49, the handle 87 is manipulated to lower the frames 49 into the development tank 180. Then the knob 87 is turned to rotate said frames 49 in said tank 180.

The handle 87 is then lifted and the turntable 105 rotated through gearing 175 and 176 by handle 27 to next position 1, 2, 3, 4, 5 or 6 as shown on dial 25 in Fig. 2. This will bring a wash water container 180 axially below rod 79 permitting the frames 49 to be washed.

This is repeated for the fixing solution and wash water following fixing. Then door 11 is opened and developed and fixed frames 49 removed therethrough.

As many changes could be made in the above photographic device and many apparently widely different embodiments of this invention could be made without departing from the scope of the claims, it is intended that all matter contained in the above description or shown in the accompanying drawings shall be interpreted as illustrative and not in a limiting sense.

Having now particularly described and ascertained the nature of the invention, and in what manner the same is to be performed, what is claimed is:

1. In a photographic exposing, developing and printing device of the type comprising a light tight container, a removable light tight sub-container for receiving a roll of continuous photographic sensitive strip material, a camera device having a focal plane back portion slotted at each side to receive said strip material, rollers to advance said strip material a frame at a time, the combination therewith of holders to receive said frames after exposure, a cutter to cut said frames after exposure and liquid containers to process said frames to develop and fix the photographic image thereon, said holders being formed of a bank of spring fingers arranged to grasp the frames before cutting and a vertical support for said holders carrying pairs of spring fingers forming said holders in a closely spaced parallel arrangement, one pair above the other, each pair of spring fingers receiving a cut exposed sheet of photographic sensitive strip material, and means to move said support in steps after each exposure and after each pair of spring fingers has received an exposed cut piece of strip material, said last-mentioned means including a ratchet and rack arrangement.

2. In a photographic exposing, developing and printing device of the type comprising a light tight container, a removable light tight sub-container for receiving a roll of continuous photographic sensitive strip material, a camera device having a focal plane back portion slotted at each side to receive said strip material, rollers to advance said strip material a frame at a time, the combination therewith of holders to receive said frames after exposure, a cutter to cut said frames after exposure and liquid containers to process said frames to develop and fix the photographic image thereon, said holders being provided with a pawl and tooth arrangement to advance the holders in stepwise fashion to receive successive frames and a vertical support for said holders carrying pairs of spring fingers forming said holders in a closely spaced parallel arrangement, one pair above the other, each pair of spring fingers receiving a cut exposed sheet of photographic sensitive strip material, and means to move said support in steps after each exposure and after each pair of spring fingers has received an exposed cut piece of strip material, said last-mentioned means including a ratchet and rack arrangement.

3. A manually controlled continuous photographic exposing, developing and printing camera construction of the type comprising a light tight casing including a sensitized paper supply, a lens system, a dark chamber to receive said sensitized paper supply, an exposure chamber to hold and position the paper to be exposed and manual operating means to operate the lens system to cause exposures and to advance the paper into the chamber from the supply and out of the chamber after exposure, the combination therewith of a cutting, framing, fixing and washing arrangement also included in said casing, said arrangement comprising holders to grasp the sides of the exposed paper, a cutter to cut the exposed paper, an actuator to move the holders after cutting of the paper, containers for developing, fixing and washing solutions to receive said holders carrying said cut papers and a carrier to carry said containers and a vertical support for said holders carrying pairs of spring fingers forming said holders in a closely spaced parallel arrangement, one pair above the other, each pair of spring fingers receiving a cut exposed sheet of photographic sensitive strip material, and means to move said support in steps after each exposure and after each pair of spring fingers has received an exposed cut piece of strip material, said last-mentioned means including a ratchet and rack arrangement.

4. The construction of claim 3, said carrier taking the form of a turntable and manually actuated to rotate said carrier so that one container after another will be presented to said holders and so that holders carrying cut exposed paper may be lowered in successive containers and then elevated after the treatment has been completed.

5. In a photographic device of the type having a light-proof casing, a film strip roller holder carrying a continuous strip of photographic sensitive material, a lens arrangement, a support plate in the focal plane of said arrangement, roller feed means to feed the film strip onto said plate and away from said plate after exposure, the combination therewith of holding means consisting of a plurality of spring fingers and a cutter means to cut said film after exposure and passage away from said plate and means to receive and hold said cut exposed film and a vertical support for said holders carrying pairs of spring fingers forming said holders in a closely spaced parallel arrangement, one pair above the other, each pair of spring fingers receiving a cut exposed sheet of photographic sensitive strip material, and means to move said support in steps after each exposure and after each pair of spring fingers has received an exposed cut piece of strip material, said last-mentioned means including a ratchet and rack arrangement.

6. The device of claim 5 in which said means have manual actuators outside of said casing.

7. The device of claim 5, said receiving and holding means being provided with rotatable receptacles for developing, washing and fixing of the cut film.

TORRANCE R. LAING.

REFERENCES CITED

The following references are of record in the file of this patent:

UNITED STATES PATENTS

| Number | Name | Date |
|---|---|---|
| 1,359,481 | Beidler | Nov. 23, 1920 |
| 1,477,674 | Towbridge | Dec. 18, 1923 |
| 1,822,677 | Taylor | Sept. 8, 1931 |
| 1,875,215 | Caps | Aug. 30, 1932 |
| 2,256,981 | Klein | Sept. 23, 1941 |
| 2,380,378 | Allen | July 31, 1945 |